July 23, 1935. W. H. FRANK 2,009,376
ELECTRICAL DISTRIBUTION SYSTEM
Filed July 18, 1934
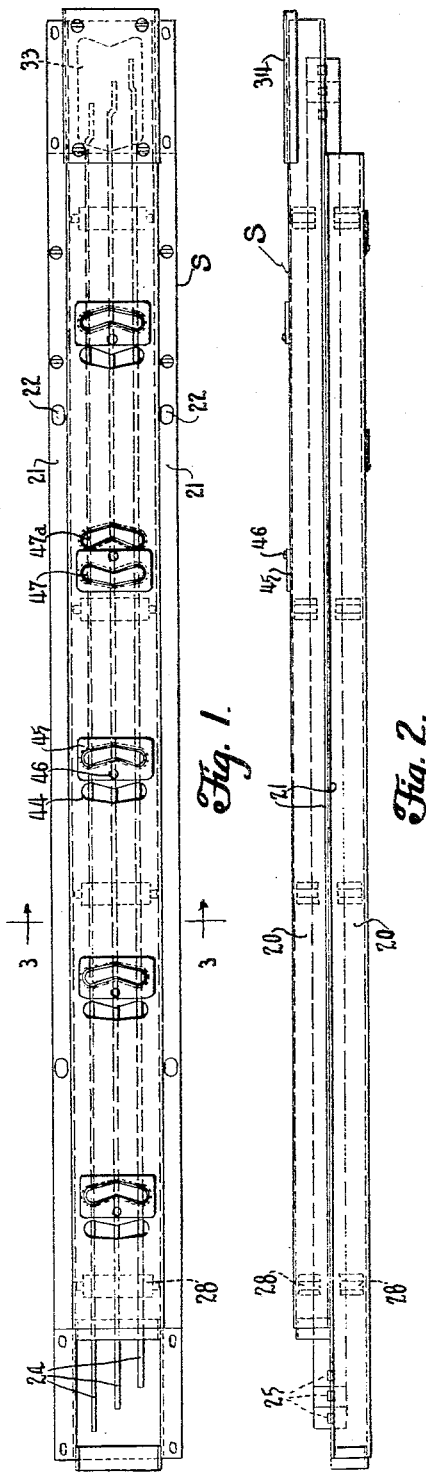

Patented July 23, 1935

2,009,376

UNITED STATES PATENT OFFICE 2,009,376

ELECTRICAL DISTRIBUTION SYSTEM

William H. Frank, Detroit, Mich., assignor to Bulldog Electric Products Company, Detroit, Mich., a corporation of West Virginia Application July 18, 1934, Serial No. 735,743

4 Claims. (Cl. 247—3)

This application relates to electrical distribution systems. It more particularly relates to the class of systems shown and described in a prior application, Serial #692,910, filed October 9, 1933.

The invention of the present application relates to novel details of construction of plug entrances which can best be understood in connection with the appended drawing. In this drawing, Figure 1 is a top plan view of a standard section of bus-duct;

Figure 2 is a side elevational view of the same.

For an understanding of the invention of this application, reference may be had to the above-mentioned case, Serial #692,910, which describes the system to which the details and arrangements of this application relate. Inasmuch as the invention of this application relates only to novel details of construction and novel arrangements not shown in that application, the description here given will be confined to such details of manufacture, representing alternatives for and improvements over the constructions shown in that application.

Referring to Figures 1 and 2, it will be seen that these figures show a standardized, pre-equipped, bus-duct section S, adapted to be assembled with identical sections, end to end, to form a bus-duct system. Each section includes two similar or identical sheet metal casing halves 20 of equal length and having cooperating longitudinal edge flanges 21 through slotted holes 22 of which may be passed casing joining bolts 23.

Inside the metal casing formed by the juxtaposition of the halves are bus bars 24 having ends apertured at 25, and the center to center distance between the apertures 25 is equal to the length of the casing halves. The bus bars are electrically and mechanically connected to one another by lap-scarf joints at their ends, effected by bolts passed through the apertures 25 at the ends of the bus bars and are supported by identical halves of insulators 28.

The casing walls are cut out near the section ends and at points overlying bus bar joints to provide hand holes 33 through which access may be had to the bus bar ends for the purposes of manipulating their connecting bolts, and these hand holes are normally covered by channelled hand hole cover plates 34 secured in place by certain of the bolts 23 passed through edge flanges of the cover plates and through the edge flanges 21.

At intervals along the sections there are provided external access providing means, such as the crescent-shaped slots 44 traversing the bus bars, and through these, and thus through the casing, contacts may be inserted for engagement with the bus bars for current take-off. These contacts form parts of current take-off or plug-in devices, not here shown.

The unused ones of the holes 44 are covered up by plates 45 swiveled to the casing on rivets or bolts 46 and secured in place over the holes by crescent-shaped embossments 47 which match the shape of the holes 44 and fit tightly therein; the plates form dustproof closures for the holes. The casing halves are provided with crescent-shaped embossments 47a near their crescent-shaped holes 44, which may receive the embossments 47 cooperating to latch the plates 45 in open position.

The crescent shape for holes 44 is chosen because its center is out of line with its ends, and thus automatically insures proper polarization of the plug contacts with respect to the bus bars, without requiring any disturbance of the symmetrical arrangement of the bus bars and other duct parts.

Now having described novel details and arrangements of the bus-duct system shown in this application, reference will be had to the following claims which determine the scope of the invention of this application.

What I claim is:

1. In a duct for electrical distribution systems, three parallel bus bars in the same plane and equally spaced, a duct wall having a crescent shaped elongated slot traversing the bus bars with the apex of the crescent in registry with the center bus bar, for receiving the three prongs of a plug to make contact with said bus bars, the shape of the slot and the arrangement of prongs being complemental to prevent improper insertion of the plug.

2. In a duct for electrical distribution systems, parallel bus bars, a hole in a wall of the duct and traversing the bus bars, a flat closure plate therefor pivotally mounted on the duct wall so as to be swingable in its own plane into or out of hole closing position, the plate having an embossment of the shape of said hole which fits therein when the plate is swung to close the hole and forms a dust-proof closure for said hole, the duct wall having an inward embossment near said hole for receiving the plate embossment when the plate is swung to expose the hole, the engagement of the embossments latching the plate in hole-exposing position, the pivotal mounting being between the duct hole and the duct embossment.

3. An electrical distribution system comprising a bus duct run including a completely closed duct run containing three naked rigid flat narrow bus bar runs whose flat surfaces are substantially perpendicular to opposed sides of the duct run, these having entrances for contacts of plugs to be associated with the duct run with their contacts engaging the flat surfaces of the bus bar runs, the bus bar runs being in the same plane and equally spaced, the relation of the group of bus bar runs to one of the opposed sides being substantially similar to the relation of the group of bus bar runs to the other of the opposed sides, the entrances being crescent-shaped elongated slots traversing the bus bars with their apices in registry with the center bus bar, for receiving the three prongs of plugs adapted to make contact with the bus bars, the shape of the slots and the arrangement of the prongs being complemental to prevent improper insertion of the plugs.

4. An electrical distribution system comprising a bus duct run including a completely closed duct run containing three naked rigid flat narrow bus bar runs whose flat surfaces are substantially perpendicular to opposed sides of the duct run, these having entrances for contacts of plugs to be associated with the duct run with their contacts engaging the flat surfaces of the bus bar runs, the bus bar runs being in the same plane and equally spaced, the relation of the group of bus bar runs to one of the opposed sides being substantially similar to the relation of the group of bus bar runs to the other of the opposed sides, the duct run having opposed sets of formations for mounting the plugs with the relation of the group of bus bar runs to one set of these formations being substantially similar to the relation of the group of bus bar runs to the other set of these formations, the entrances being crescent-shaped elongated slots traversing the bus bars with their apices in registry with the center bus bar, for receiving the three prongs of plugs adapted to make contact with the bus bars, the shape of the slots and the arrangement of the prongs being complemental to prevent improper insertion of the plugs.

WILLIAM H. FRANK.